United States Patent [19]
Fukuda et al.

[11] Patent Number: 5,163,396
[45] Date of Patent: Nov. 17, 1992

[54] COMBUSTION CHAMBER FOR INJECTED ENGINE

[75] Inventors: Takafumi Fukuda; Takeshi Ito; Keiichi Harada, all of Iwata, Japan

[73] Assignee: Yamaha Hatsudoki Kabushiki Kaisha, Iwata, Japan

[21] Appl. No.: 814,865

[22] Filed: Dec. 30, 1991

[30] Foreign Application Priority Data

Feb. 6, 1991 [JP] Japan ................................ 3-36920

[51] Int. Cl.$^5$ ................................ F02B 3/00
[52] U.S. Cl. ................................ 123/298; 123/310; 123/661
[58] Field of Search ............ 123/298, 310, 661, 73 C, 123/664, 73 A, 309, 73 BA

[56] References Cited

U.S. PATENT DOCUMENTS

| 2,988,067 | 6/1961 | Böltgar | 123/298 |
| 4,318,377 | 3/1982 | Occella et al. | 123/298 |
| 4,844,025 | 7/1989 | Scheaffer | 123/310 |
| 4,920,937 | 5/1990 | Sasaki et al. | 123/298 |
| 5,062,396 | 11/1991 | Duret et al. | 123/73 BA |
| 5,063,888 | 11/1991 | Ozawa et al. | 123/73 C |
| 5,105,795 | 4/1992 | Ozawa et al. | 123/661 |

Primary Examiner—Raymond A. Nelli
Attorney, Agent, or Firm—Ernest A. Beutler

[57] ABSTRACT

A number of embodiments of combustion chambers for direct cylinder injected engines wherein the combustion chamber has a recess surrounded by a squish area. The fuel injector is disposed so that it will spray into the recess against the wall rather than toward the squish area. Alternate spark plug locations are disclosed.

17 Claims, 7 Drawing Sheets

COMBUSTION CHAMBER FOR INJECTED ENGINE

BACKGROUND OF THE INVENTION

This invention relates to a combustion chamber for an internal combustion engine and more particularly to an improved combustion chamber for a fuel direct injected internal combustion engine.

It has been recognized that the fuel efficiency and exhaust emission control for an internal combustion engine may be improved by employing direct cylinder injection. This method of fuel injection is particularly useful in conjunction with two-cycle crankcase compression engines. However, it has been generally the practice to position the fuel injector in the cylinder head of the engine and dispose so that it will spray into a combustion chamber formed primarily by a recess in the cylinder head of the engine. The spray nozzle is generally directed toward the head of the opposing piston.

With this type of combustion chamber, however, it is the normal practice to employ some squish action. That is, the recess in the cylinder head which forms the major portion of the combustion chamber is surrounded by a restricted area formed between the head of the piston and the unrecessed area of the cylinder head. When the piston approaches top dead center, the charge which is compressed in the squish area is forced into the recessed area.

One disadvantage with the use of squish action with previously proposed types of fuel injection is that it does not permit maximum fuel efficiency, particularly at idle and low speed operation. Under these operations, it is the practice to spray the fuel into the combustion chamber in a somewhat stratified fashion so that a homogeneous mixture need not be filled in the entire combustion chamber. However, if a restricted amount of fuel is sprayed into the combustion chamber under low and mid-range running conditions the squish action can cause the rich fuel air mixture to be driven away from the gap of the spark plug causing misfiring or improper combustion.

It is, therefore, a principal object of this invention to provide an improved combustion chamber for an internal combustion engine having direct cylinder injection and wherein good stratification may be obtained even at low and mid-range speeds with significant squish action.

It is a further object of this invention to provide an improved direct injected internal combustion engine wherein it will be insured that a stoichiometric mixture is present at the gap of the spark plug at the time of firing regardless of whether or not squish action is employed.

SUMMARY OF THE INVENTION

This invention is adapted to be embodied in a combustion chamber for an internal combustion engine that is comprised of a cylinder block which defines a cylinder bore. A piston reciprocates within the cylinder bore and a cylinder head is affixed to the cylinder block enclosing the cylinder bore. The cylinder head, piston and cylinder bore define a combustion chamber that is comprised of a recessed area surrounded at least in part by a squish area when the piston approaches top dead center. A fuel injector is supported by the engine and is disposed to inject its spray within the recess toward the walls defining the recess and away from direct entry into the squish area. Spark plug means are carried by the engine and are disposed within the recessed area for firing the fuel injected by the fuel injector.

DETAILED DESCRIPTION OF THE PREFERRED EMBODIMENTS OF THE INVENTION

Figure 1:
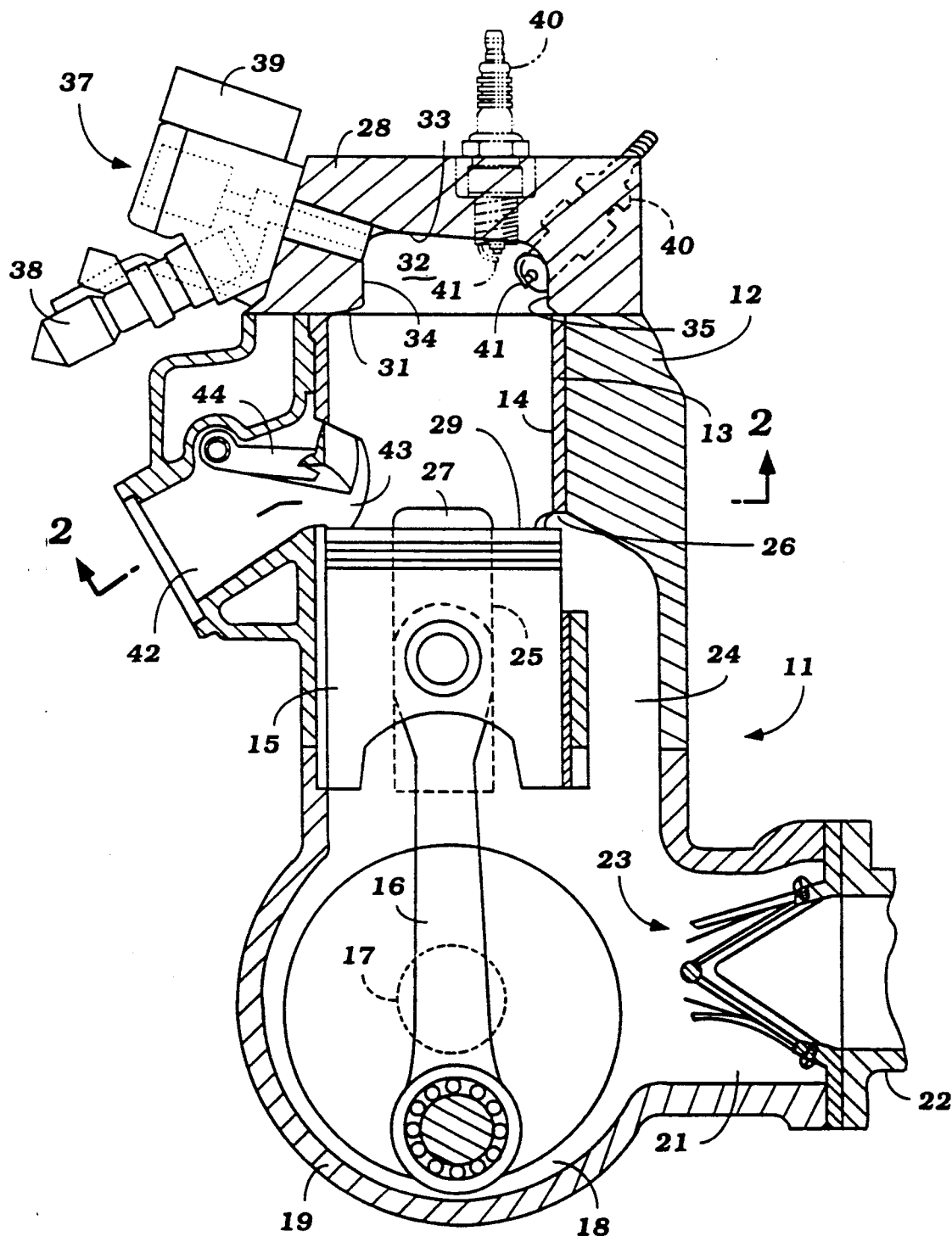
FIG. 1 is a cross sectional view taken through one cylinder of a multiple cylinder, fuel injected, two-cycle crankcase compression, internal combustion engine constructed in accordance with a first embodiment of the invention.

Referring now in detail to the drawings and initially to the embodiment of FIGS. 1 through 5, a three cylinder, inline, two-cycle crankcase compression, internal combustion engine constructed in accordance with an embodiment of the invention is identified generally by the reference numeral 11. Although the invention is described in conjunction with a three cylinder inline engine, it should be readily apparent to those skilled in the art how the invention can be practiced with engines having other cylinder numbers or cylinder configurations. Also, although the engine 11 is depicted as being of a two-cycle crankcase compression principal, where the invention has most utility, the invention may also be employed in conjunction with engines operating on the four stroke cycle.

The engine 11 is comprised of a cylinder block 12 having three aligned pressed in or cast in cylinder liners 13 which form cylinder bores 14. Pistons 15 reciprocate within the cylinder bores 13 and are connected by means of connecting rods 16 to a crankshaft 17. The crankshaft 17 is rotatably journaled within a crankcase chamber 18 defined by a skirt at the lower end of the cylinder block 12 and a crankcase member 19 that is affixed to the cylinder block 12 in any appropriate manner. As is conventional with two cycle engine practice, the crankcase chambers 18 associated with each of the cylinder bores 14 are sealed relative to each other.

An inlet charge is delivered to each of the crankcase chambers 18 through a respective intake port 21 from an intake manifold, shown partially and identified by the reference numeral 22. A reed type check valve 23 is positioned in each inlet port 21 so as to permit the charge to flow from the intake manifold into the crankcase chambers 18 but not in the opposite direction when the pistons 15 are moving downwardly to compress the charge in the crankcase chambers 18. The charge admitted to the inlet ports 21 may be a pure air charge or may, under some or all running conditions, also include fuel supplied either by an auxiliary fuel injector or a carburetor. It may be desirable to provide some fuel flow through the intake ports 21 under high speed high load operation so as to assist in cooling of the engine.

Figure 2:
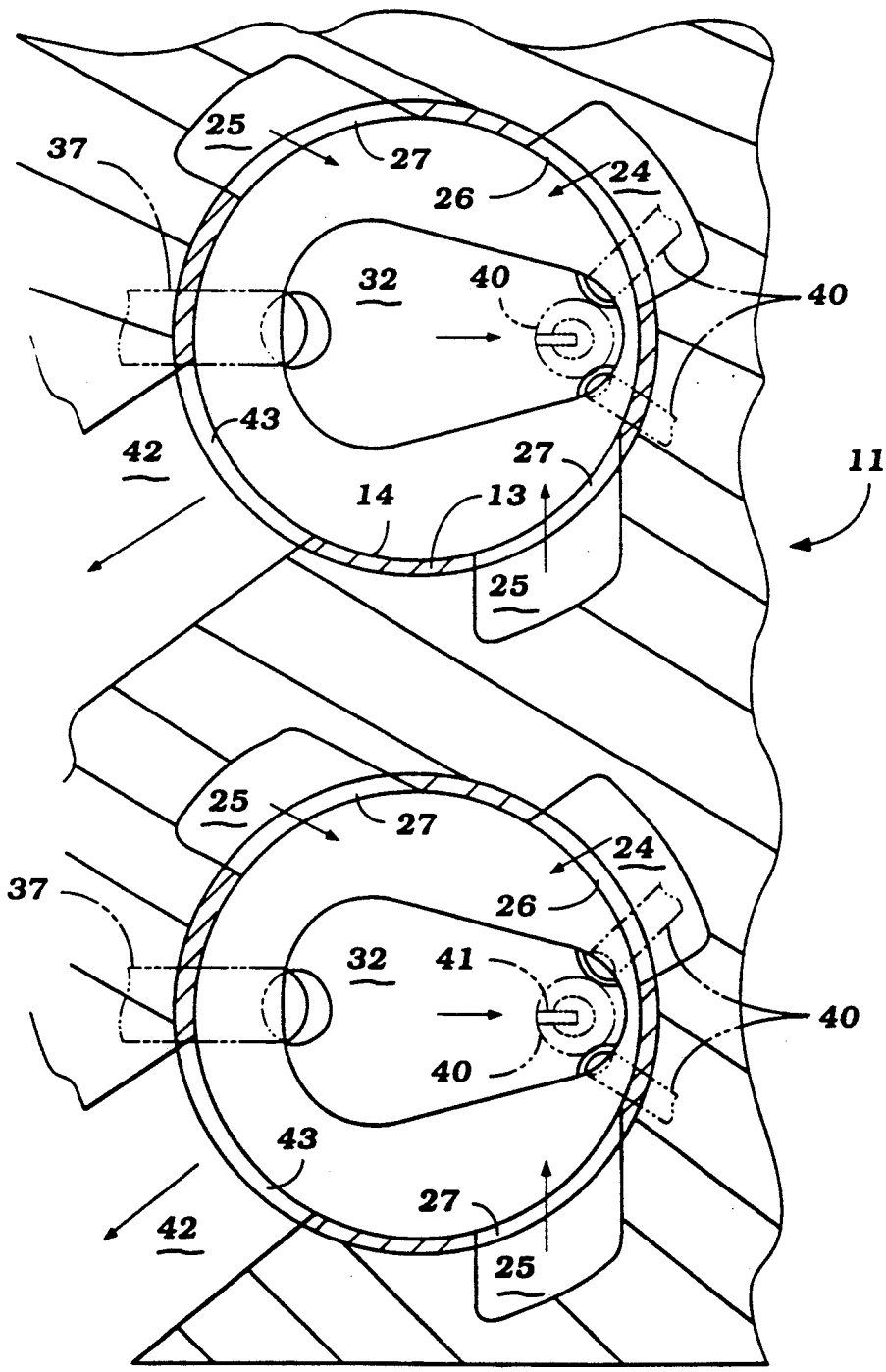
FIG. 2 is a partial cross sectional view taken along the line 2—2 of FIG. 1.
Figure 3:
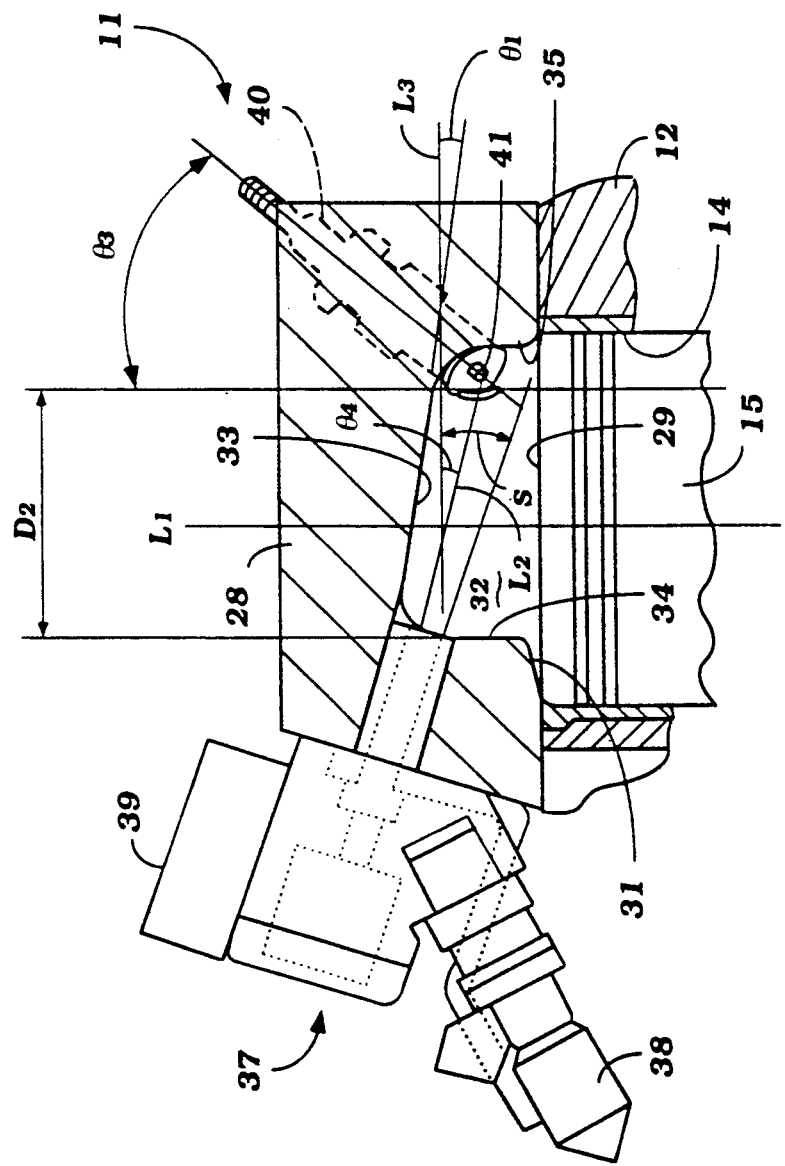
FIG. 3 is a further enlarged cross sectional view, in part similar to FIG. 1, showing the configuration of the combustion chamber and the components associated with it.
Figure 4:
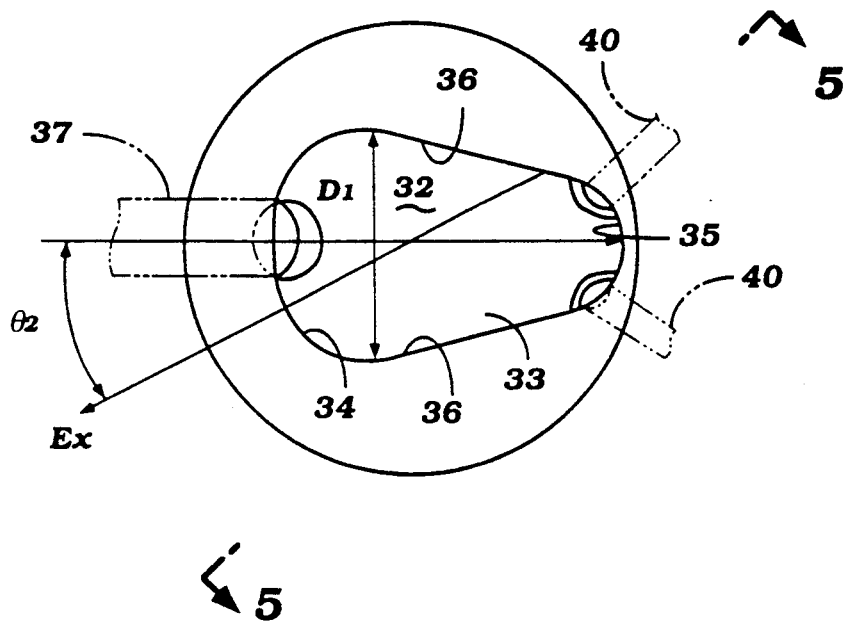
FIG. 4 is a view, in part similar to FIG. 2, and shows the angular relationship of the various components.
Figure 5:
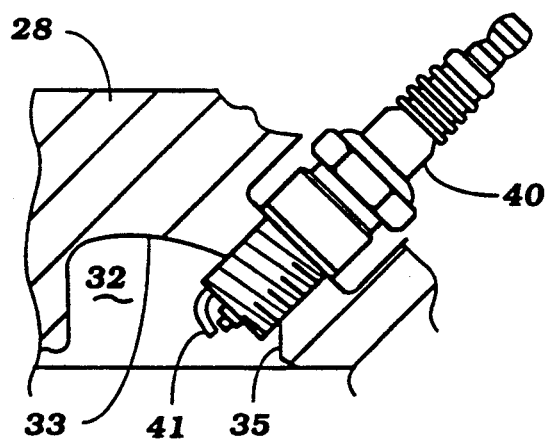
FIG. 5 is a cross sectional view taken along the line 5—5 of FIG. 4 and further shows the combustion chamber configuration.

A charge which is admitted to the crankcase chambers 18 will, as has been noted, become compressed upon downward movement of the pistons 15 and then is transferred to the area above the pistons 15 through a scavenge port system which, in the illustrated embodiment, is comprised of a center scavenge passage 24 and a pair of side scavenge passages 25 which terminate in respective scavenge ports 26 and 27 formed at circumferentially spaced locations in the cylinder liner 13 around the cylinder bore 14 as may be clearly seen in FIG. 2. As may be clearly seen in FIG. 2, the scavenge passages 24 and 25 are rotated about the axis of the cylinder bores so as to permit the cylinder bores 14 and cylinder liners 13 to be positioned closer to each other than would be possible if the center scavenge passage 24 were disposed at one side of the cylinder block 12. This permits a shortening of the overall length of the engine.

A cylinder head 28 is affixed to the cylinder block 12 in a known manner and cooperates with the cylinder bore 14 and the head 29 of the pistons 15 to form the combustion chamber. The cylinder head 28 has a planer lower surface 31 in which a recess 32 is formed. The recess 32 has a downwardly inclined upper surface 33, disposed at an angular relationship which will be described, and a generally tapered tub shape as shown best in FIG. 4 that is comprised of a first generally large radius arcuate wall 34 and a smaller radius arcuate wall 35 which walls 34 and 35 are joined by converging sidewalls 36.

This combustion chamber recess 32 is also offset toward one side of the cylinder bore 14 so that there will be a greater squish area adjacent and around the larger radius curved wall 34 than the smaller radius curved wall 35. As a result, there will be more squish action adjacent the wall 34 and the adjacent sidewalls 36 than around the smaller radius curved wall 35 and its adjacent sidewalls 36. The significance of this will become apparent.

An air fuel injector, indicated generally by the reference numeral 37 is mounted in the cylinder head 28 at one side of the recess 32 and specifically where the large radius curved sidewall 34 meets the top wall 33 of the cylinder head 28. As may be seen in FIG. 3, the fuel injector 37 is supported so that its injection valve has its axis L2 disposed at a relatively shallow angle to the top of the cylinder block 12 and so that its spray which subtends an arch S will be directed substantially toward the cylinder head recess wall 35 and not toward the surrounding squish area. This is done so that when injection occurs at low speed low load conditions, the squish action will not interfere with the flow of the fuel from the injector nozzle 37 toward the spark plugs, which will be described. As a result, even though only small amounts of fuel may be injected at idle and low speed, a rich fuel air mixture will be delivered to the spark plugs.

As has been previously noted, normally fuel air injectors 37 are mounted so that the axis L2 is generally parallel to or aligned with the cylinder bore axis L1. This will result in disbursion of the fuel spray by the squish action and can interfere with effective combustion, particularly at low speeds and low loads.

The air fuel injector 37 may be of any type and includes a fuel injector 38 that sprays fuel into an internal cavity of the air fuel injector 37 in a sequence which will be described. In addition, compressed air is delivered to the air fuel injector 37 through an air manifold 39 so as to assist in the vaporization and disbursion of the fuel delivered by the fuel injector 38. Although the invention is described in conjunction with an air fuel injector 37, it is to be understood that the invention may also be practiced with engines having only direct cylinder fuel injection as to opposed to fuel air injection. However, the invention has particular utility in conjunction with engines embodying fuel air injection.

A pair of spark plugs 39 are mounted in the cylinder head 28 with their gaps 41 being disposed on the inner surface of the wall 35 on diametrically opposite sides of a plane containing the axis of the cylinder bore (L1) and extending perpendicularly to the axis of rotation of the crankshaft 17. Hence, the spark gaps 41 will be disposed in the direct path of fuel flow, as may be seen in FIG. 3, and good ignition will be possible even when operating with very low amounts of fuel injection as at idle and low speed low load operation.

It should be noted that the distance D2 between the injection valve of the fuel injector 37 and spark gaps 41 is relatively great in so far as the dimension of the combustion chamber is concerned. This will insure good vaporization of the fuel at idle while, at the same time, avoiding disruption of the fuel by the minimal squish action which will occur at the side of the combustion chamber recess 32 where the small radius wall 35 is positioned. Also, it should be noted that the top wall 33 of the recess 32 is disposed at a relatively shallow angle $_1$ to a horizontal plane L3 so that the area of the recess 32 also tapers downwardly toward the area of the spark gaps 41. This will further insure against sufficient squish action that would interfere with the fuel reaching the spark gaps 41. Also, the angle 4 between the injector axis L2 and the plane L3 is relatively small and is approximately equal to the angle $_1$ or slightly larger than it. This will further insure that good combustion can occur.

The spark plugs 40 are disposed so that their center electrodes are disposed at an angle $_3$ to a plane parallel to the cylinder bore axis L1 and to the axis of rotation of the crankshaft. Hence, this provides good combustion efficiency while, at the same time, maintaining a low cylinder head height since neither the spark plugs 40 nor the fuel air injectors 37 are disposed in a vertical orientation.

In conjunction with this embodiment, it may be possible to position one of the spark plugs 40 in a vertical orientation so that its gap 41 enters through the upper wall 33 of the recess 32 as best shown in FIG. 1 by the phantom line view.

The burnt charge is then exhausted through an exhaust passage 42 that is aligned with the center scavenge passage 24 and hence is disposed at an angle $_2$ to a plane containing the cylinder bore axis L1 and extending perpendicularly to the axis of rotation of the crankshaft 17. This permits a so called Schnurel type of scavenging action while, at the same time, minimizing the overall length of the engine, as has already been noted. The exhaust passage 42 terminates in an exhaust port 43 that is formed in the cylinder liner 13. If desired, an exhaust control valve 44 may be positioned in the exhaust passage 42 so as to mask the exhaust port 43 and change the timing of the opening of the exhaust passage 42 during the running of the engine so as to improve combustion.

Figure 6:
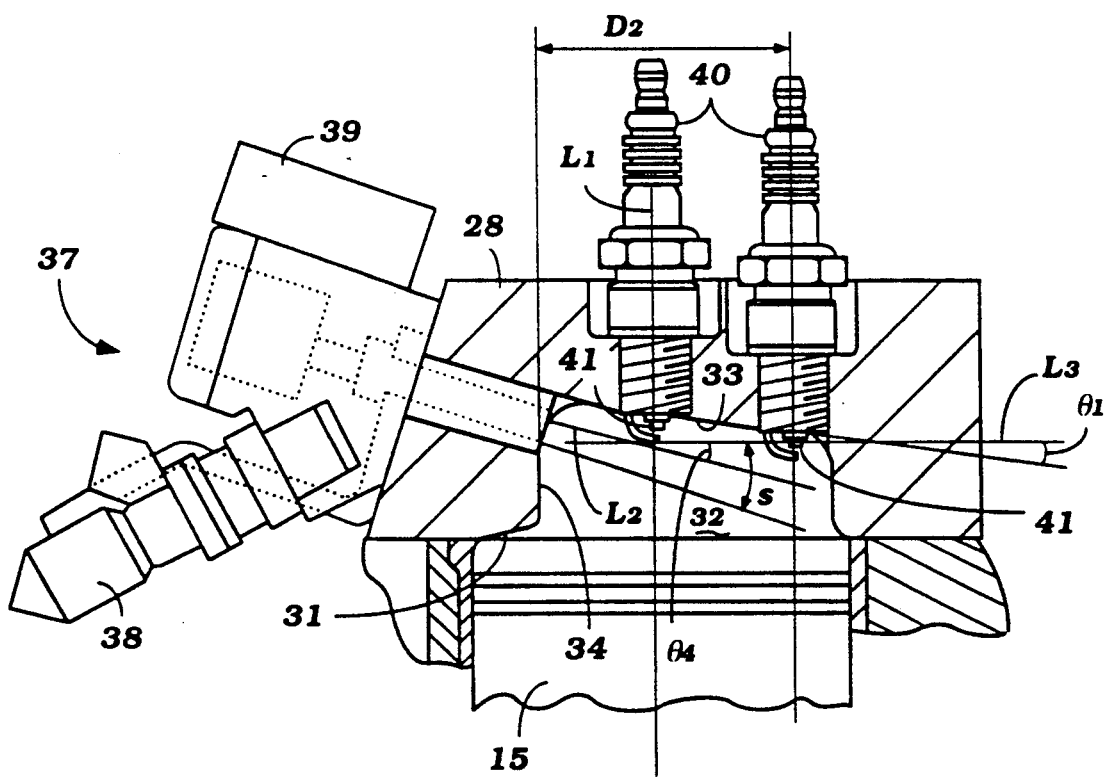
FIG. 6 is a partial cross sectional view, in part similar to FIG. 1, and shows another embodiment of the invention.
Figure 7:
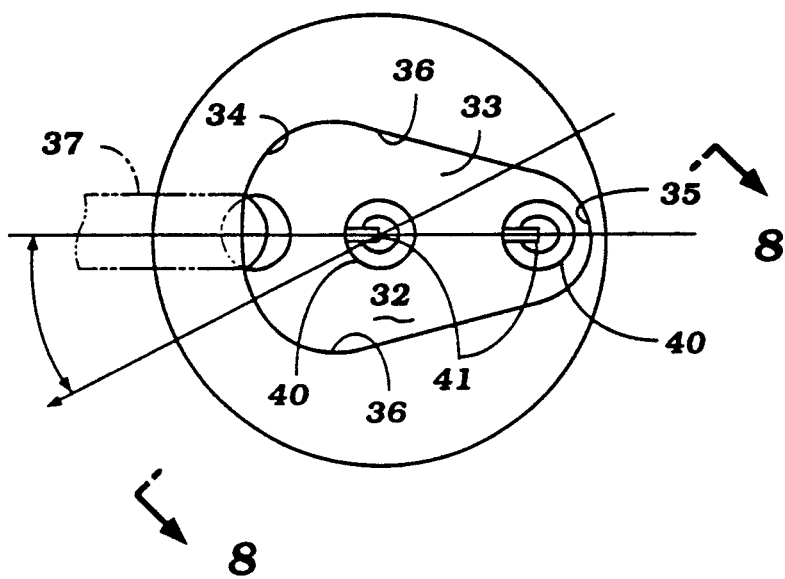
FIG. 7 is a view in part similar to FIG. 4 and shows the geometric relationship of the components in this embodiment.
Figure 8:
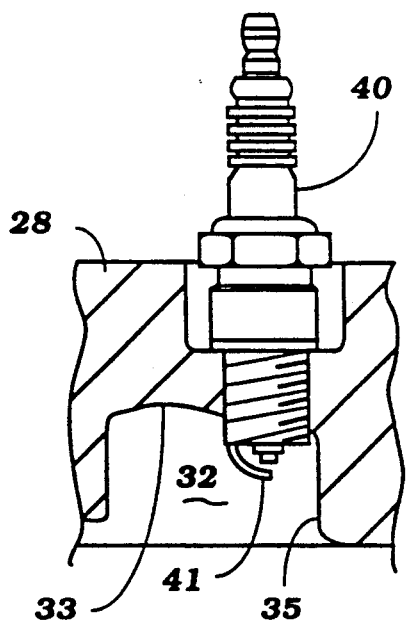
FIG. 8 is a cross sectional view taken along the line 8—8 of FIG. 7.

The embodiments of the invention as thus far described, at least one spark plug has been mounted in the sidewall 35 of the cylinder head recess 32. FIGS. 6 through 8 show another embodiment of the invention, which is substantially the same as the previously described embodiment in that the construction of the basic engine and configuration of the cylinder head recess is the same. For that reason, components which are the same have been identified by these same reference numerals.

In this embodiment, however, a pair of spark plugs 40 are both mounted with their gaps 41 lying substantially in the cylinder head top surface 33 with one spark plug having its gap at the distance D2 as with the previously described embodiment and the other spark plug having its gap directly on the cylinder bore axis L1. This latter spark plug is employed for firing the charge at idle or low speed operation.

Figure 9:
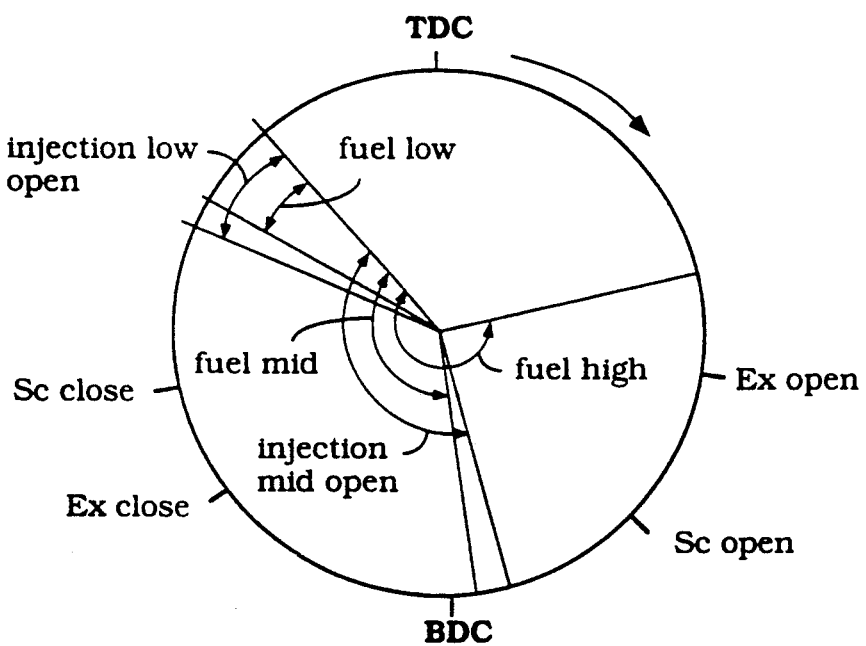
FIG. 9 is a timing diagram showing the relationship of fuel injection, opening and closing of the injector valve, opening and closing of the various ports and ignition in accordance with an embodiment of the invention.

As will become apparent by reference to FIG. 9, the fuel injection occurs very late in the timing and just before firing of the spark plug under idle and low speed operation. Hence, even though the spark plug on the cylinder bore axis L1 is very close to the nozzle of the fuel air injector 38 the fuel will have a good opportunity to be vaporized before it will reach the center spark plug and good firing will be insured. If desired, this embodiment may fire this center spark plug only during idle and low speed operation. Under high speed high load operation, the side spark plug will be adequate to insure good combustion.

The timing of the spray of the fuel from the fuel injector 38 of the fuel air injector 37 and the opening and closing of the injector valve of this fuel air injector under varying speed and load conditions will now be described by particular reference to FIG. 9. FIG. 9 is a timing chart showing the top dead center, bottom dead center and exhaust and scavenged port timing events as well as the time when fuel is injected by the fuel injector 38 and when the injection valve of the fuel air injector 37 is opened.

One strategy of the fuel air injectors employed is the so called "precharged" type. In this type of fuel air injector all fuel is injected into the fuel air injector chamber before the injection valve is opened. Although the invention may be employed in conjunction with such an injector, it is preferable to use a non-precharged type of strategy as shown in this figure.

As will be noted at low load low speed conditions, the injector valve is opened sometime after the scavenge port closes and after the injector valve is opened, then fuel injection begins. The fuel injection is stopped at about the same time the injector valve is closed and this is just shortly prior to the firing of the spark plugs 40. Because of this arrangement, the spark plug placement shown in FIGS. 6 through 8 is possible.

As the speed and load of the engine increases, the timing of injection valve opening is advanced a is the timing of fuel injection by the injectors 38. Under this condition the injector valve opens before fuel is injected as may be seen by the mid-range portion of FIG. 9.

However, as the load and speed increase, the injection valve opening is not advanced further and then some precharging may be accomplished by beginning injection of the fuel by the fuel injector 38 before the injector valve is opened. However, even under this condition the bulk of the fuel is injected after the injection valve is opened.

It should be readily apparent from the foregoing description that the described combustion chamber configurations permit very good stratification even at low speed and low load while maintaining good combustion and avoiding misfiring. Of course, the foregoing description is that of preferred embodiments of the invention and various changes and modifications may be made without departing from the spirit and scope of the invention, as defined by the appended claims.

We claim:

1. A combustion chamber for an internal combustion engine comprising a cylinder block defining a cylinder bore, a piston reciprocating within said cylinder bore, a cylinder head affixed to said cylinder block enclosing said cylinder bore, said cylinder head, said piston and said cylinder bore defining a combustion chamber comprised of a recessed area surrounded by a squish area when said piston approaches top dead center position, a fuel injector supported by said engine and disposed to inject its spray within said recess toward the walls defining said recess and away from entry into said squish area, and spark plug means carried by said engine and disposed within said recessed area for firing the fuel injected by said fuel injector.

2. A combustion chamber as set forth in claim 1 wherein the fuel spark plug means is disposed with its gap in the path of spray from the fuel injector.

3. A combustion chamber as set forth in claim 2 wherein the fuel injector and the spark plug means are disposed in opposing walls defining the recess.

4. A combustion chamber as set forth in claim 3 wherein the spark plug means comprises at least a pair of spark plugs.

5. A combustion chamber as set forth in claim 4 wherein one of the spark plugs is fired at a different time of the other of the spark plugs under at least some running conditions.

6. A combustion chamber as set forth in claim 1 wherein the recess is defined by a pair of curved walls joined by generally straight walls.

7. A combustion chamber as set forth in claim 6 wherein the fuel spark plug means is disposed with its gap in the path of spray from the fuel injector.

8. A combustion chamber as set forth in claim 7 wherein the fuel injector and the spark plug means are disposed in opposing walls defining the recess.

9. A combustion chamber as set forth in claim 8 wherein the spark plug means comprises at least a pair of spark plugs.

10. A combustion chamber as set forth in claim 9 wherein the fuel injector and the spark plug means are disposed in opposing walls defining the recess.

11. A combustion chamber as set forth in claim 6 wherein one of the curved walls has a substantially greater radius than the other of the curved walls.

12. A combustion chamber as set forth in claim 11 wherein the fuel spark plug means is disposed with its gap in the path of spray from the fuel injector.

13. A combustion chamber as set forth in claim 12 wherein the fuel injector and the spark plug means are disposed in opposing walls defining the recess.

14. A combustion chamber as set forth in claim 13 wherein the spark plug means comprises at least a pair of spark plugs.

15. A combustion chamber as set forth in claim 14 wherein one of the spark plugs is fired at a different time of the other of the spark plugs under at least some running conditions.

16. A combustion chamber as set forth in claim 1 wherein the recess is defined within the cylinder head by a pair of opposite facing curved walls interconnected by generally straight walls and enclosed at its upper surface by a downwardly inclined upper wall with the spark plug means positioned at the lower side thereof and the fuel injector positioned at the upper side thereof.

17. A combustion chambers as set forth in claim 16 wherein the spray axis of the fuel injector is substantially parallel to the angle of the top wall of the recess.

* * * * *